United States Patent [19]

Terry et al.

[11] 3,730,994

[45] May 1, 1973

[54] SYNCHRONIZING ARRANGEMENTS

[75] Inventors: John Brian Terry, Great Totham, Maldon, Essex; David Fleming Corlett, Chelmsford, both of England

[73] Assignee: The Marconi Company Limited, London, England

[22] Filed: Aug. 31, 1970

[21] Appl. No.: 68,210

[30] Foreign Application Priority Data

Aug. 30, 1969 Great Britain....................43,277/69

[52] U.S. Cl. ............178/69.5 TV, 307/269, 328/63, 178/69.5 R

[51] Int. Cl................................H03k 5/13, H04l 7/08

[58] Field of Search..................178/69.5 R, 69.5 TV, 178/68; 325/38 A, 68; 179/15 BS, 15 BM, 15 BY; 307/269, 234, 265; 328/63, 74, 111, 72, 119, 120, 139, 208, 209

[56] References Cited

UNITED STATES PATENTS

| | | | |
|---|---|---|---|
| 3,158,864 | 11/1964 | Lehan | 179/15 BA |
| 2,912,684 | 11/1959 | Steel | 325/38 A |

OTHER PUBLICATIONS

Black, Modulation Theory, 1953, Van Nostrand Company, pp. 263–266.

*Primary Examiner*—Robert L. Griffin
*Assistant Examiner*—John C. Martin
*Attorney*—Baldwin, Wight & Brown

[57] ABSTRACT

A synchronizing arrangement includes a source of a bi-polar signal at a fundamental synchronizing frequency in every $n^{th}$ cycle of which the portion of time in the half cycle occupied by a signal excursion of one sense is varied with respect to the portion of time occupied by signal excursions of said one sense in other half cycles. The signal excursion variations are detected so as to provide a synchronizing signal at $1/n$ of the fundamental frequency.

7 Claims, 6 Drawing Figures

INVENTORS
John Brian Terry
and
David Fleming Corlett
BY Baldwin Wight & Brown
ATTORNEYS INVENTORS
John Brian Terry
and
David Fleming Corlett
BY Baldwin Wight & Brown ATTORNEYS INVENTORS
John Brian Terry
and
David Fleming Corlett
BY Baldwin Wight & Brown ATTORNEYS INVENTORS
John Brian Terry
and
David Fleming Corlett
BY Baldwin Wight & Brown ATTORNEYS

SYNCHRONIZING ARRANGEMENTS

The present invention relates to synchronizing arrangements for use in systems in which a number of different synchronizing frequencies is required, there being a fundamental frequency and the other frequency or frequencies being a fraction or fractions of this fundamental frequency formed by dividing the basic frequency by a whole number.

The common way of providing synchronizing signals in such systems is to use a synchronizing signal source giving an output signal at the fundamental frequency which output is then fed to one or more dividing circuits to provide the lower synchronizing frequency or frequencies. This arrangement has the disadvantage that should a cycle of the basic frequency be lost or should there be a burst of noise which appears to the dividing circuits to correspond to the addition of one or more cycles then the output from the dividing circuits will be displaced in time and subsequent faults may produce a substantial cumulative displacement.

To overcome this problem it is possible to utilize a separate source for each required synchronizing frequency and to feed the outputs of these sources to the desired location in a system over individual leads. However in a large system this arrangement is more expensive since it requires more leads than the first mentioned arrangement and in addition the leads have to be carefully routed to avoid stray pick-up of signals from these leads in different parts of the system.

It is an object of the invention to provide a synchronizing arrangement in which synchronizing signals may be provided at a plurality of frequencies and which signals may be distributed using a signal conductor whilst avoiding the disadvantages of the aforementioned arrangements.

According to this invention a synchronizing arrangement includes a source of a bi-polar signal at a fundamental synchronizing frequency in every $n^{th}$ cycle of which the portion of time in the half cycle occupied by a signal excursion of one sense is varied with respect to the portion of time occupied by signal excursions of said one sense in other half cycles; and means for detecting the signal excursion variations so as to provide a synchronizing signal at $1/n$ of the fundamental frequency.

Preferably, to enable the production of a symmetrical bi-polar signal which may be transmitted via transformers without producing substantial distortion, for every time variation of the signal excursion in one sense there is a corresponding time variation of the signal excursion in the opposite sense.

Preferably, when a third synchronizing frequency is required, every $x^{th}$ time, variation of said signal excursion in the opposite sense is effected in a different cycle to that in which it is normally effected and means is provided to detect the occurrence of the change in cycle of the time variation of said signal in the other sense so as to provide a synchronizing signal at a frequency $1/nx$ of the fundamental frequency.

In the preferred embodiment, for use in pulse code modulation equipment, the bi-polar excursions are rectangular in form and occupy 50 percent of the time of the half cycle in which they occur and said variations are effected by extending the signal excursions to occupy a whole half cycle. Preferably the variations in the signal excursions in said other sense are spaced from the signal excursions in said one sense by more than one cycle of the fundamental frequency but every $x^{th}$ variation they occur in the immediately succeeding half cycle to that in which the variation in the signal excursion in said one sense occurs.

The invention will now be described, by way of example, with reference to the accompanying drawings in which.

Figure 1:
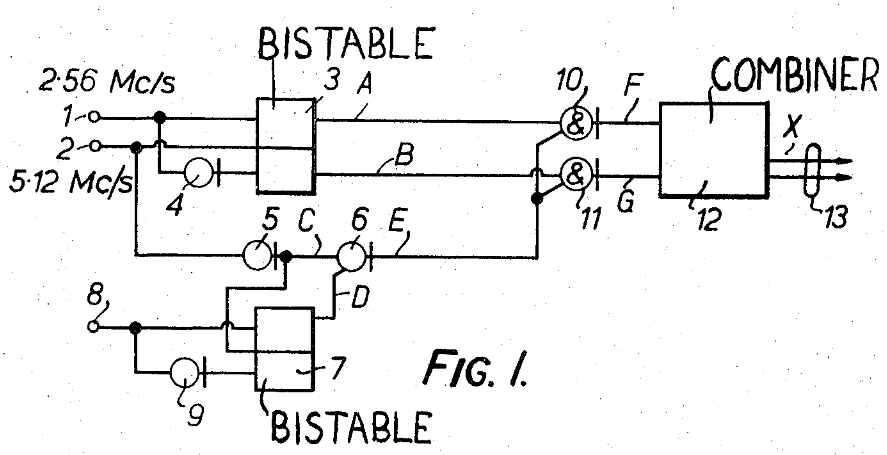
FIG. 1 is a synchronizing signal source for use in a synchronizing system in accordance with the invention.

In the synchronizing signal source shown in FIG. 1 there are two signal inputs 1 and 2 to which are applied constant frequency rectangular waveform signals at frequencies of 2.56 megacycles and 5.12 megacycles respectively. The input 1 is directly connected to one input of a clocked or gated bistable circuit 3 and is connected via an inverter 4 to the other input of bistable 3. The input 2 is connected to the clock input of bistable 3 and is also connected via an inverter 5 to one input of a NOR gate 6 and also to the clock input of a second clocked bistable circuit 7. A modulation signal input 8 is connected directly to one input side of the bistable 7 and indirectly via an inverter 9 to the other input of bistable 7. The two clocked bistables 3 and 7 are different in that bistable 3 is arranged to be clocked or strobed by a clock pulse edge going from '0' to '1' whereas the bistable 7 is arranged to be strobed by a clock pulse edge going from '1' to '0'.

Figure 4:
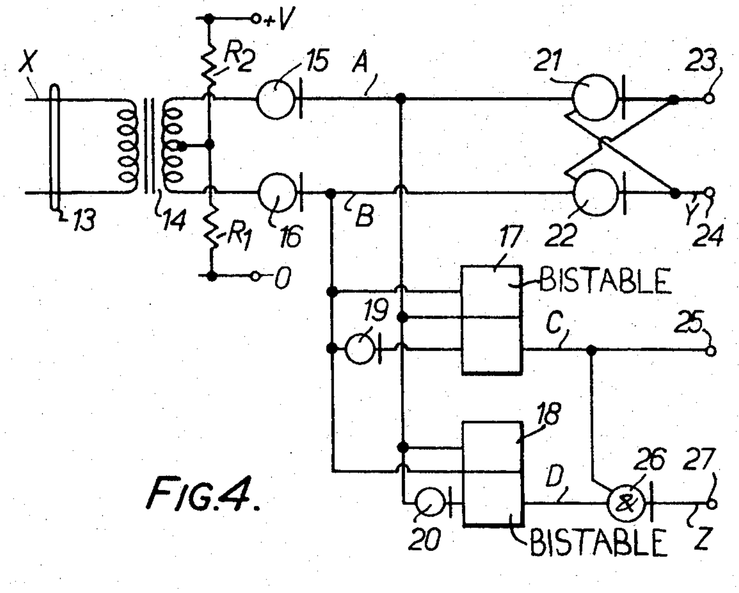
FIG. 4 shows a synchronizing frequency detector for use in a synchronizing system in accordance with the invention.

The clocked bistables 3 and 7 used in the circuit of FIG. 1, and as will be shown later the clocked bistables used in the circuit of FIG. 4, are of the kind which have two inputs to which signals are applied of opposite sense and which commonly in practice have two outputs, these being shown diagrammatically as occurring directly opposite an input but on the other side of the rectangular representation of the bistable, and which when gated or clocked produce, at an output, an output signal which is the same as the input signal appearing at the corresponding input at the time of occurrence of the clock signal. If only one of the outputs is to be used then only that output is shown in the drawings.

Each output from bistable 3 is connected to one input of a respective AND gate 10, 11 the other inputs of which are both connected to the output of NOR gate 6. The NOR gate 6 in addition to the input from inverter 5, has a second input from the output of bistable 7. The outputs of the inverting AND gates 10 and 11 are connected to an amplifier and combining circuit 12 which is arranged to invert the signal from AND gate 10 and arranged to add this inverted signal to the output of AND gate 11 after this has been given a negative D.C. shift. The resultant bipolar output is fed to a transmission line pair 13 for transmission to and utilization in a synchronizing system.

The arrangement of FIG. 1 operates as follows:

A 2.56 megacycle clock frequency is applied to input 1 and a 5.12 megacycle clock frequency is applied to input 2. The 5.12 megacycle frequency is used to gate or strobe the bistable 3 which, as will all the bistables shown in the drawings, is a so-called gated bistable, i.e., it presents at its output, signals which correspond to the input signals pertaining at the instant of gating and these outputs are maintained constant until a subsequent gating signal is applied. Bistable 3 is arranged to be gated by a signal transition going from a '0' to a '1'. A modulation signal is arranged to be applied at input 8. The desired fundamental frequency required in the synchronizing system is 2.56 megacycles and by the expression modulation signal as used herein is meant the signal required to produce additional synchronizing frequencies at frequencies lower than the fundamental frequency of 2.56 megacycles.

The arrangement shown in FIG. 1 is intended for use in a P.C.M. exchange in which three synchronizing frequencies are required: the first, a fundamental clock frequency, at 2.56 megacycles, the second, a frame frequency, at 2.56/320 megacycles and the third, a multi-frame synchronizing frequency, at 2.56/320 × 16 megacycles. The modulation signal applied at input 8 is arranged to produce the frame and multi-frame synchronizing content of the output of the synchronizing signal generator of FIG. 1.

Figure 2:
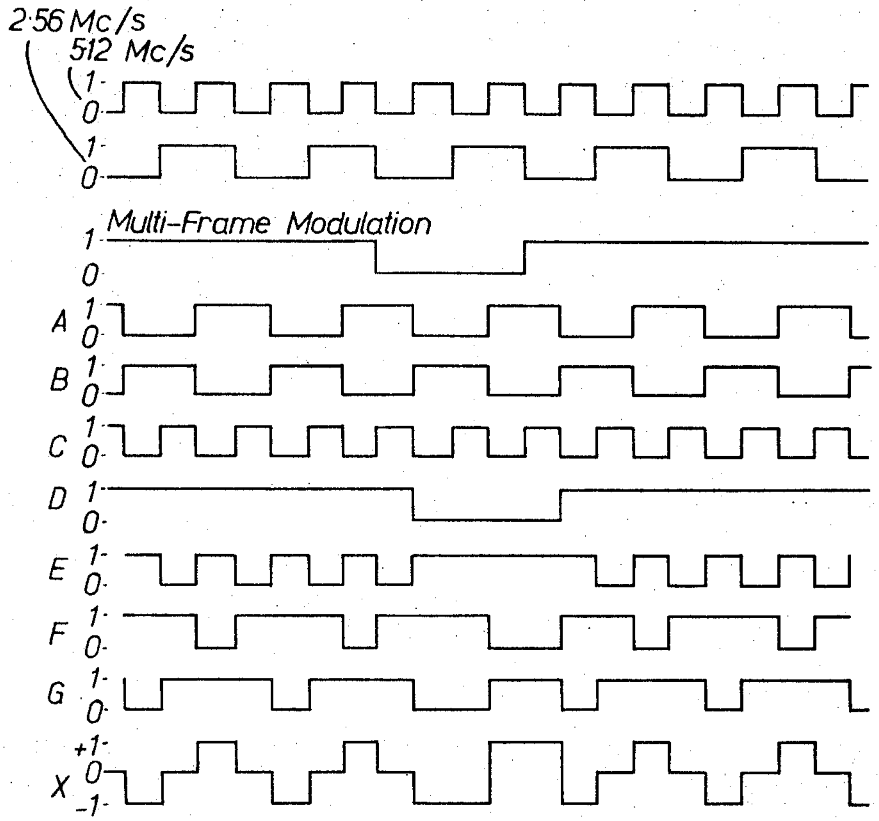
FIGS. 2 and 3 show signal waveforms occurring at various points in the circuit of FIG. 1.

Referring to FIG. 2 there is shown in this figure waveforms occurring, during operation, at different parts of the circuit of FIG. 1. In the first and second lines are shown the two input clock frequency signals, applied at terminals 1 and 2 and in the third line is shown the modulation signal required at input 8 to produce a multi-frame synchronizing signal content in the output of the generator. The remaining lines are referenced with letters which correspond to reference letters used in the circuit of FIG. 1 and these waveforms occur at the points indicated by those reference letters.

As can be seen from the drawing, the application of the 2.56 Mc/s signal to the two inputs of the gated bistable 3 in phase opposition and the gating of this bistable by the 5.12 Mc/s input results in the square wave outputs shown in lines A and B. These outputs are also at 2.56 Mc/s frequencies and in phase opposition but they are phase shifted by 90° and 270° respectively with respect to the original 2.56 Mc/s signal. The clock frequency from input 2 is also fed after inversion by inverter 5 to the input of a NOR gate 6. The other input of NOR gate 6 comes from the output of the gated bistable 7, which output corresponds to the modulation signal appearing at input 8 at the time of gating of the bistable by the inverted clock frequency from input 2. The gated bistables 3 and 7 differ in that bistable 3 is gated by a pulse transition from a '0' to a '1' whereas the bistable 7 is gated by a transition from a '1' to a '0'.

The modulation signal for the multi-frame synchronization signal is shown in line 3 of FIG. 2 and from the output of bistable 7, therefore, there is obtained the signal shown in line D of FIG. 2. The resultant output of NOR gate 6 is shown in line E and this is applied to AND gates 10 and 11. The outputs of these AND gates is shown in lines F and G. When these two outputs are applied to the amplifier and combiner circuit 12, the output A is inverted and added to the output B which is D.C. shifted — the negative sense by the amplitude of the signal and the resulting output from the circuit 12 is shown in line X of FIG. 2. It will be seen that this comprises a bi-polar signal at a frequency of 2.56 megacycles with the positive and negative excursions occupying only a quarter of a cycle and with output amplitude being zero for the two remaining quarter cycles. However, when the multi-frame modulation pulse is applied this results in a negative going signal excursion being extended for a whole half cycle and this extension is immediately followed in the next half cycle by extension of the positive going excursion to occupy the full half cycle.

Figure 3:
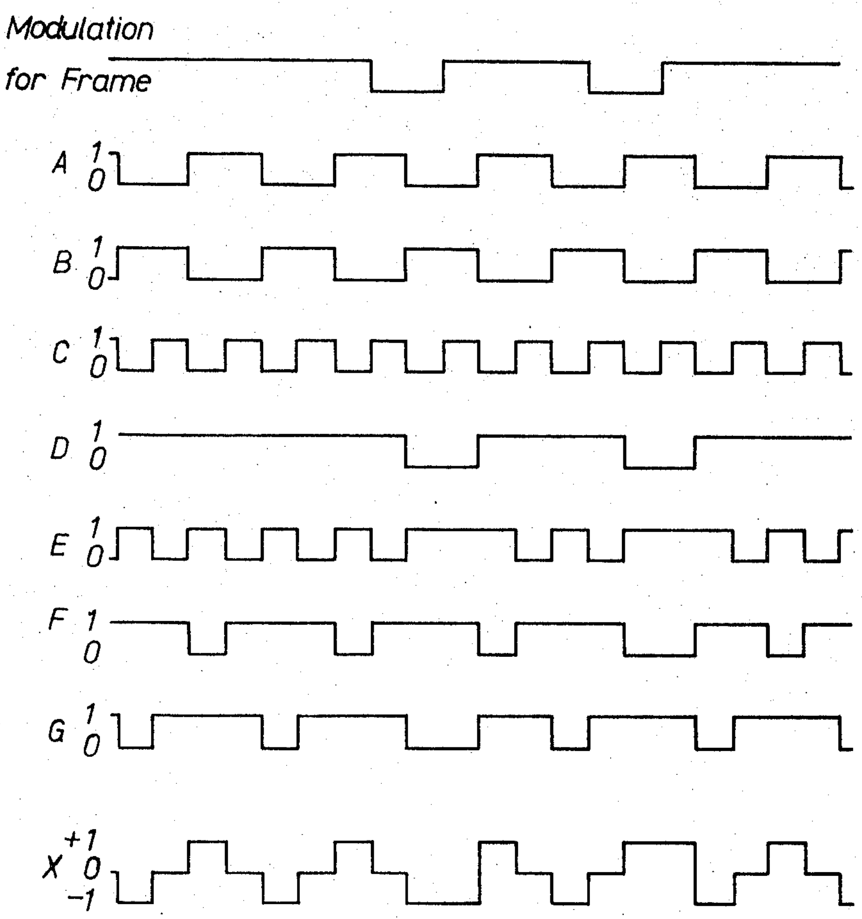

Referring to FIG. 3, this also shows in letter referenced lines waveforms corresponding to the lettered points in the circuit of FIG. 1. In the first line is shown the modulation waveform applied to produce a synchronizing signal content corresponding to the frame frequency synchronization signal. It will be seen that this corresponds to two separated spaced pulses, each of half the duration of the multi-frame modulation pulse. These however, result in the production of a synchronizing waveform as shown in the bottom line of FIG. 3. In this case also there is an extension of the time occupied by a negative going excursion from a quarter cycle to a half cycle but this is not immediately followed by an extension of the positive going excursion, the extension of the positive going excursion taking place a full cycle later.

The multi-frame modulation is applied to the input 8 with a frequency of (2.56/320 × 16) Mc/s and the frame modulation is applied with a frequency of (2.56/320) Mc/s. A multi-frame synchronizing output pulse occurs every 16th frame synchronizing pulse. The frame synchronizing frequency content is contained in the extension of the negative going excursion. For purely frame synchronization, the subsequent positive going extension is superfluous and simply serves to produce a symmetrical waveform about zero amplitude so that the waveform can be utilized in transformer coupled arrangements without distortion. The multi-frame synchronizing signal does, of course, utilize time extension of the positive going signal excursion since to identify a multi-frame synchronizing pulse the occurrence of both the positive and negative going signal excursion extensions have to be detected and the timing relationship therebetween assessed.

A synchronizing signal detection arrangement is shown in FIG. 4 and receives the composite synchronizing signal over the bi-polar transmission line 13 which is coupled to the primary winding of a transformer 14. The secondary winding of this transformer is center tapped with the center tap being connected to a potential divider formed of resistors R1 and R2 connected sequentially between zero potential and a positive +V potential and each end of the center tap winding being connected to a threshold circuit 15, 16. The output of threshold circuit 16 is connected directly to one input of a gated bistable 17 and to the clock input of a gated bistable 18 and in addition is connected indirectly via an inverter 19 to the second input of bistable 17. Similarly, the output of threshold circuit 15 is connected directly to the clock input of bistable 17 and to one input of bistable 18 and indirectly via the inverter 20 to the other input of bistable 18. In addition the outputs of the threshold circuits 15 and 16 are connected directly and respectively to inputs of NOR/NAND gates 21 and 22. The output of NOR gate 21 is connected to a second input of NOR gate 22 and the output of NOR gate 22 is connected to a second input of NOR gate 21. The outputs of NOR gates 21 and 22 are connected to two output terminals 23 and 24 respectively to provide thereat fundamental frequency synchronizing signals of mutually opposite phase. The single output bistable 17 is connected to an output terminal 25 and also to one input of an inverting AND gate 26. A second input to AND gate 26 is connected to the single output of bistable 18 and the output of AND gate 26 being connected to an output terminal 27.

Figure 5:
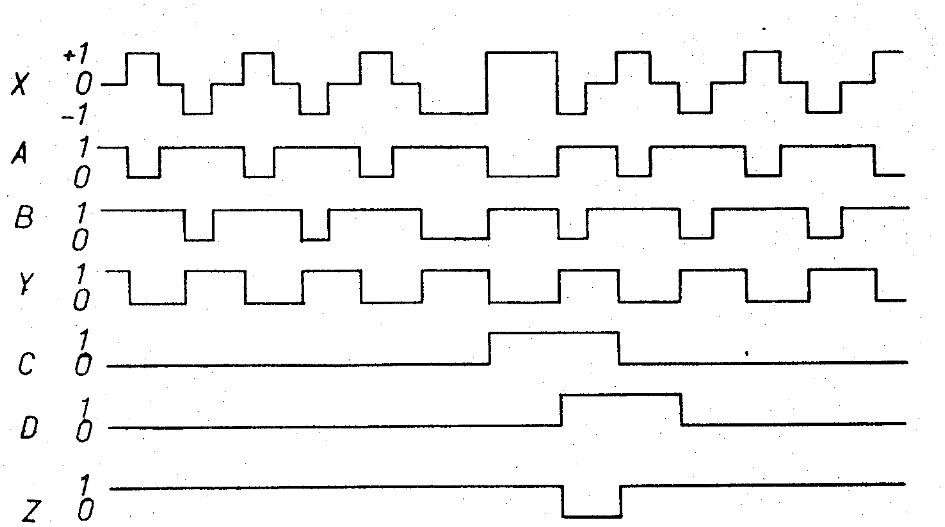
FIGS. 5 and 6 show signal waveforms occurring at various points in the circuit of FIG. 4.
Figure 6:
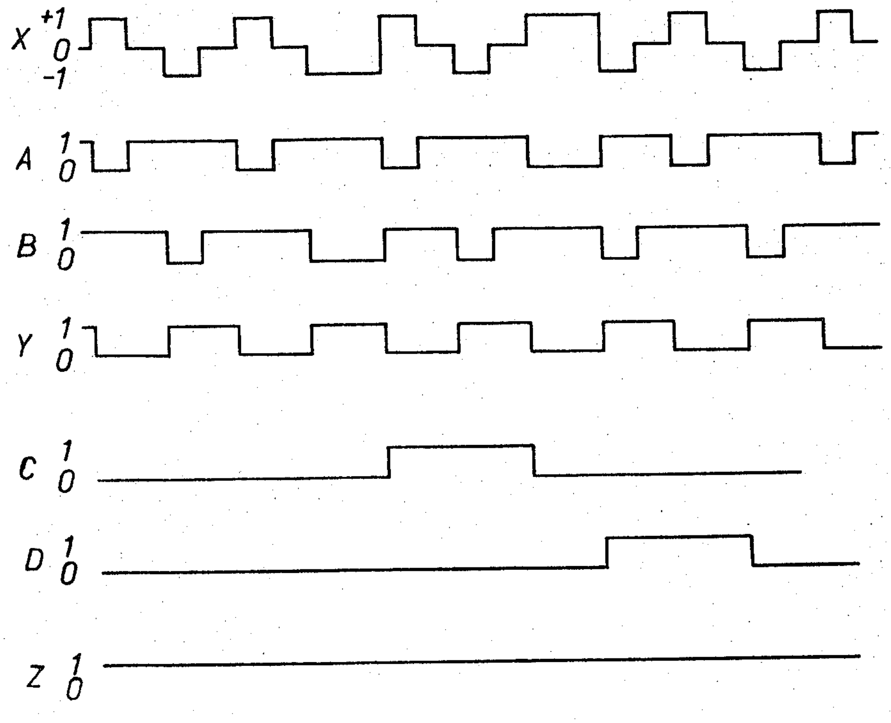

The synchronizing signal detection arrangement of FIG. 4 operates as follows:

The bi-polar waveform obtaining at the input to the detector, as indicated by the reference X, is shown in the line marked X in FIGS. 5 and 6. In FIG. 5 this waveform shows, in addition to the fundamental frequency bi-polar information, multi-frame synchronizing signal content and in FIG. 6 frame synchronizing signal content, as explained with reference to FIGS. 1 to 3. The waveform in FIGS. 5 and 6 are referenced with letters and occur at the points, indicated by the corresponding letters in FIG. 4. The bipolar waveform is applied to the transformer 14 and from the center tapped secondary winding thereof to the two threshold voltage circuits 15 and 16. These circuits are arranged to pass only the positive going portions of the signals applied thereto. The outputs of circuits 15 and 16 are, therefore, as shown in lines A and B of FIG. 5. These two waveforms are applied to a bistable arrangement constituted by the two cross-coupled NAND/NOR gates 21 and 22. Each of these gates has an operating "truth table" as follows:

| L | M | N |
|---|---|---|
| 0 | 0 | 1 |
| 0 | 1 | 1 |
| 1 | 0 | 1 |
| 1 | 1 | 0 |

where L and M are the two input signals and N the resulting output of the NAND/NOR gate. As a result of the cross coupling there will be produced at the outputs 23 and 24, two phase opposed rectangular waveform synchronizing signals each at a frequency 2.56 Mc/s, the output appearing at terminal 24 being shown in line Y of FIG. 5.

The signals on lines A and B are also applied, as shown, to the gated bistables 17 and 18. These bistables are gated by signal transitions from '1' to '0' and the outputs of these circuits are shown in lines C and D of FIG. 5, the output on line C being the frame synchronizing output. A multi-frame pulse output occurs after a positive pulse is present on line C at the same time as a positive pulse is present on line D this is detected by the AND gate 26. This only occurs when a positive going excursion occurs immediately following the negative going extension as shown in FIG. 5.

In FIG. 6 there is shown a synchronizing waveform in which the frame frequency synchronizing information is contained. The waveform lines are referenced in the same manner as the lines of FIG. 5 and it can be seen that in this case because of the spacing between the negative going signal excursion extension and the positive signal excursion extension the pulses at output C and D do not overlap and therefore no multi-frame pulse is obtained but solely a frame pulse.

Whilst the arrangement described utilizes bi-polar signals in which the signal excursions (positive and negative) only occupy a quarter of a cycle, other signal excursion times can be used. Obviously a symmetrical bi-polar signal with half cycle duration excursions could be used and the frame pulses and the multi-frame pulses could be indicated by reducing the signal excursion time, in selected half cycles, to a duration below that of half a cycle in a corresponding manner to the way they are extended in the described arrangement. In addition the separation between the positive and negative going signal extensions is not limited to one cycle when solely frame synchronizing information is to be given; it may be more than a cycle. Alternatively the frame synchronizing information may require the time extensions of the signal excursions to occur in subsequent half cycles and the multi-frame information would then be incorporated by increasing the separation. This however would have the slight disadvantage that no frame pulse would would be obtained during the multi-frame timing pulse.

We claim:

1. A synchronizing arrangement including source means for producing a bi-polar signal at a fundamental synchronizing frequency normally having in successive half cycles time portions occupied by signals of opposite senses and time portions occupied by signals of an intermediary level and in every $n^{th}$ cycle of which the portion of time in the half cycle occupied by a signal excursion of one sense is varied with respect to the portion of time occupied by signal excursions of said one sense in other half cycles; and means for detecting the signal excursion variations so as to provide a synchronizing signal at $1/n$ of the fundamental frequency.

2. A synchronizing arrangement according to claim 1 wherein said source means includes means for producing in every time variation of the signal excursion in one sense a corresponding time variation of the signal excursion in the opposite sense.

3. A synchronizing arrangement according to claim 2 wherein said source means includes means arranged such that every $x^{th}$ time, variation of said signal excursion in the opposite sense is effected in a different cycle to that in which it is normally effected and means is provided to detect the occurrence of the change in cycle of the time variation of said signal in the other sense so as to provide a synchronizing signal at a frequency $1/nx$ of the fundamental frequency.

4. A synchronizing arrangement according to claim 3 wherein said source means provides bi-polar excursions rectangular in form and occupying 50 percent of the time of the half cycle in which they occur and said variations are effected by extending the signal excursions to occupy a whole half cycle.

5. A synchronizing arrangement according to claim 3 including gating means for spacing the variations in the signal excursions in said other sense from the signal excursions in said one sense by more than one cycle of the fundamental frequency but every $x^{th}$ variation they occur in the immediately succeeding half cycle to that in which the variation in the signal excursion in said one sense occurs.

6. A synchronizing arrangement comprising, in combination:

first terminal means for providing a fundamental clock signal of frequency $f$;

second terminal means for providing a synchronizing signal of frequency $(f/n)$;

signal modifying means having the signals of said first and second terminal means as inputs thereto for producing a bi-polar output signal at said frequency $f$ normally having in successive half cycles time portions occupied by signals of opposite senses and time portions occupied by signals of an intermediary level and in every $n$th cycle of which the portion of time in the half cycle occupied by a signal excursion of one sense is varied with respect to the portion of time occupied by signal excursions of said one sense in other half cycles; and means for detecting the signal excursion variations so as to provide a synchronizing signal at a frequency $(f/n)$.

7. A synchronizing arrangement as defined in claim 6 wherein said second terminal means also provides a synchronizing signal of frequency $(f/nx)$, said means for detecting also providing a synchronizing signal at a frequency $(f/nx)$.

* * * * *